United States Patent [19]

Stowe

[11] Patent Number: 4,533,208

[45] Date of Patent: Aug. 6, 1985

[54] EVANESCENT-WAVE STAR COUPLER ON A SUBSTRATE

[75] Inventor: David W. Stowe, Buffalo Grove, Ill.

[73] Assignee: Gould Inc., Rolling Meadows, Ill.

[21] Appl. No.: 477,178

[22] Filed: Mar. 21, 1983

[51] Int. Cl.³ ............................................... G08C 19/00
[52] U.S. Cl. ................................ 350/96.16; 350/96.15
[58] Field of Search ........................... 350/96.15, 96.16

[56] References Cited

U.S. PATENT DOCUMENTS

| 3,967,878 | 7/1976 | Caton | 350/96.15 |
| 4,135,780 | 1/1979 | Dyott | 350/96.15 |
| 4,330,170 | 5/1982 | Johnson et al. | |
| 4,387,954 | 6/1983 | Beasley | 350/96.15 |
| 4,444,460 | 4/1984 | Stowe | 350/96.15 X |

OTHER PUBLICATIONS

"Multimode Fiber Coupler", Ogawa et al., Jul. 1978, Applied Optics, vol. 17, No. 13.

*Primary Examiner*—William L. Sikes
*Assistant Examiner*—Akm E. Ullah
*Attorney, Agent, or Firm*—John R. Garrett; Kay H. Pierce; Edward E. Sachs

[57] ABSTRACT

A star coupler is described in which a plurality of optical fibers are embedded in a first rigid substrate. The fibers may be etched or polished to a core area to expose a first evanescent coupling zone. A second substrate has one or more optical fibers embedded in the second substrate. The optical fibers in the second substrate are similarly etched or polished to expose a second evanescent zone area. The two substrates are then placed in juxtaposition with each other so that the first and second evanescent zones are in close proximity to one another so that evanescent coupling may occur between the plurality of fibers in the first evanescent zone and one or more optical fibers in the second evanescent zone.

6 Claims, 2 Drawing Figures

EVANESCENT-WAVE STAR COUPLER ON A SUBSTRATE

BACKGROUND OF THE INVENTION

A. Field of the Invention

The subject invention relates generally to fiber optic devices using evanescent-wave coupling, and more specifically to star couplers in which the optical waveguides are embedded in a rigid substrate.

B. Description of the Prior Art

Those concerned with transmission of information through optical waveguides have frequently desired to transfer information from one waveguide to another. One method of transferring information from one optical waveguide to another involves evanescent-wave coupling in which two waveguides are placed in close juxtaposition to one another. When light is transmitted through one waveguide, it is not completely contained within that waveguide, but rather is partially dispersed into the second waveguide so that evanescent-wave coupling occurs.

In other applications, it is desirable to transfer light simultaneously from one waveguide to a plurality of other waveguides. One method of transferring light to a plurality of waveguides is to use a star coupler configuration in which a plurality of waveguides are twisted about each other to allow evanescent coupling to occur. One limitation of such couplers is that it may be difficult to control the amount of coupling that occurs from one fiber to another in a twisted fiber configuration. Another problem with such a coupler is that star couplers having a twisted fiber configuration are somewhat fragile.

SUMMARY OF THE INVENTION

In view of the above, it is an object of the subject development to provide a relatively rugged star coupler.

It is another object of the subject development to provide a star coupler with precisely controlled coupling to a plurality of fibers.

Still another object is to provide a star coupler which is relatively simple to manufacture and capable of withstanding in-field use.

Other objects, advantages, and novel features of the present invention will become apparent from the following detailed description of the invention when considered in conjunction with the accompanying drawings.

The subject invention is a star coupler for coupling light from a single or plural source to a plurality of output ports. The subject coupler includes a first rigid substrate and a first optical fiber having an outer cladding and an inner core. A portion of the outer cladding forms a molecular interface with the first rigid substrate to maintain the first fiber in a fixed spatial relationship with a first substrate. The subject invention further includes a second rigid substrate and a plurality of optical fibers in which each of the plurality of optical fibers has an outer cladding and an inner core. A portion of the cladding of each of the plurality of optical fibers forms a molecular interface with the second rigid substrate to maintain the plurality of optical fibers in a fixed spatial relationship with the second substrate. The first optical fiber and the plurality of optical fibers each has an exposed core zone in the subject development. The subject invention further includes a means for maintaining the first and second substrates in juxtaposition with one another to maintain the exposed core zone of the first optical fiber in juxtaposition with the exposed core zone of the plurality of optical fibers. In this manner, light from the first fiber may be evanescently coupled to the plurality of optical fibers in the exposed core zone of the plurality of optical fibers.

DETAILED DESCRIPTION OF THE PREFERRED EMBODIMENT

Figure 1:
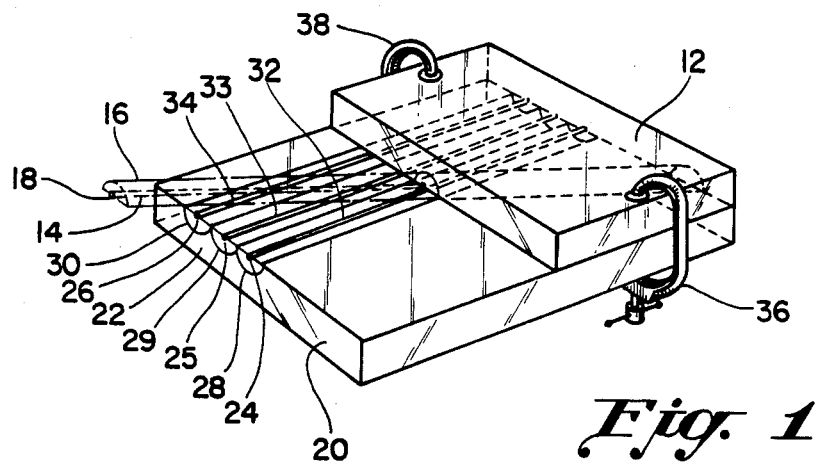
FIG. 1 is a simplified illustration of the subject invention.

Although the following description of the subject invention will refer to the embodiment illustrated in FIG. 1, it will be obvious to those skilled in the art of fiber-optic coupler applications that other configurations will be possible using the basic technique described below. The subject development comprehends that a first rigid substrate 12 may be used to maintain a first optical fiber 14. The first optical fiber 14 has an outer cladding 16 and an inner core 18. A portion of the outer cladding 16 is removed to expose a portion of the inner core 18. The cladding which remains on first optical fiber 14 has a portion forming a molecular interface with the first rigid substrate 12. The method of forming a molecular interface between the cladding of an optical fiber and a rigid substrate is the subject of a previous application owned by the same assignee, U.S. application Ser. No. 267,187, U.S. Pat. No. 4,444,458 filed May 26, 1981, incorporated herein by reference. As that application teaches, a process for molecular bonding or fusing a fiber to a substrate can be accomplished even when the fiber and the substrate have substantially different coefficients of thermal expansion. The above-mentioned application teaches that when, for example, a substrate material has a lower melting point than a fiber, the viscosity of the surface of the substrate will be lowered more readily than the viscosity of the surface of the fiber when heat is applied to a longitudinal portion of a fiber which is in juxtaposition with a surface of a substrate material. For example, a molecular interface may be formed when the substrate material is glass. Such a molecular interface can be formed between a substrate material such as Corning Code 7070 glass having a diffusible constituent of boron and an optical fiber having an outer cladding of a doped fused silica material which is relatively free of boron prior to bonding.

Another patent application which describes the method of forming a molecular interface between a substrate and an optical fiber is U.S. application Ser. No. 267,025 filed May 26, 1981, entitled optical fiber apparatus including substrate ruggedized optical fibers also incorporated by reference herein. The subject invention is yet another form of apparatus made possible through the use of ruggedized fibers. The subject invention is a form of apparatus which would not be made obvious by the apparatus disclosed in U.S. application Ser. No. 267,205 abandoned because the results achieved in the subject invention are dissimilar to the results achieved in the development discussed in the above-identified application. The results achieved by the subject invention include the desirable feature of coupling from a first single optical fiber or plurality of optical fibers to a second plurality of optical fibers in a controlled manner to allow controlled coupling between the single optical fiber and the plurality of optical fibers. A similar feature of the subject invention to the apparatus described in U.S. application Ser. No. 267,205 is that both the subject invention and the apparatus described in the previous application involve relatively rugged fiber-optic coupling apparatus in which the fibers involved may be partially embedded in their respective substrates.

As can be seen in FIG. 1, the first optical fiber has a portion of its outer cladding and molecular interface with the first rigid substrate 12 to maintain the first fiber 14 in a fixed spatial relationship with respect to the first substrate 12.

The subject invention further includes the provision of a second rigid substrate 20. The second rigid substrate 20 is typically made from the same material as the first rigid substrate 12. The subject invention further includes the provision of a plurality of optical fibers 22. The plurality of optical fibers 22 in the FIG. 1 is illustrated by three optical fibers 24–26.

Each of the plurality of optical fibers has an outer cladding 28–30 and an inner core 32–34. A portion of the outer cladding on each of the plurality of fibers forms a molecular interface with the second rigid substrate 20. The molecular interface between the plurality of optical fibers 22 and the second rigid substrate 20 causes the plurality of optical fibers to be maintained in a fixed spatial relationship with the second substrate 20. A portion of the outer cladding 28–30 of each of the plurality of optical fibers 24–26 is removed so that each fiber has an exposed core zone.

The portion of the outer cladding which is removed from both the first optical fiber 14 and the plurality of optical fibers 22 may be removed by etching or surface abrasion of the cladding of the optical fibers after a molecular interface has been formed between the core of each optical fiber and its respective substrate.

The subject invention further comprehends the use of a means for maintaining the first rigid substrate 12 and the second rigid substrate 20 in juxtaposition with one another. One such means is illustrated in FIG. 1 by clamping apparatus 36 and 38. The substrates can also be held in juxtaposition with a suitable adhesive such as epoxy or cyanoacrylate adhesive. The substrates may also be heated so that they melt together, giving rise to a direct physical bond between them. The means for maintaining the first substrate 12 and the second substrate 20 in juxtaposition with one another causes the exposed core zone of the first optical fiber 14 to be maintained in juxtaposition with the exposed core zone of the plurality of optical fibers. Thus, light from the first optical fiber may be evanescently coupled into said plurality of optical fibers in the exposed core zone of the plurality of optical fibers.

Figure 2:
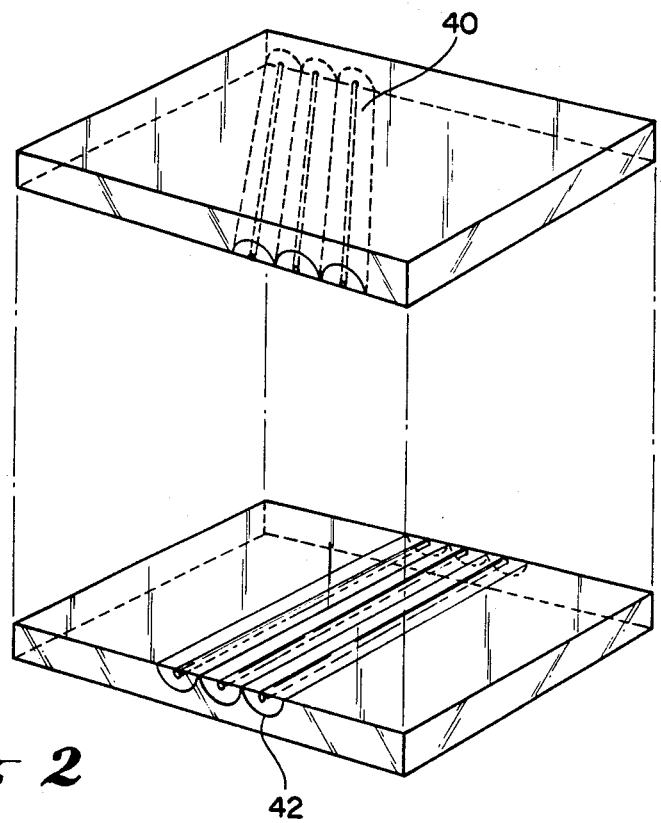
FIG. 2 is a simplified illustration of another embodiment of the subject invention.

It will be obvious to those skilled in the art that several other embodiments are within the scope of the subject invention. For example, instead of using a single optical fiber 14, it may be desirable in some applications to use a plurality of optical fibers such that a first plurality of optical fibers 40 will be maintained in juxtaposition with a second plurality of optical fibers 42 to allow multiple coupling to occur as illustrated in FIG. 2. Also in other applications, within the scope of this invention, it may be desirable to allow coupling of light to occur from the plurality of optical fibers to the single optical fiber rather than the form of coupling discussed above.

Other variations on the embodiment disclosed as the preferred embodiment herein include the use of single mode, multi-mode, polarization-preserving fibers, etc., to form either the first optical fiber or the plurality of optical fibers. It will be obvious to those skilled in the art that another variation possible from the preferred embodiment is to vary the angle of the first optical fiber with respect to the plurality of optical fibers.

Although the invention has been described and illustrated in detail, it is to be clearly understood that the same is by way of illustration and example only, and is not to be taken by way of limitation; the spirit and scope of this invention being limited only by the terms of the appended claims.

I claim:

1. A star coupler for coupling light from a single source to a plurality of output ports, comprising:
    a first rigid substrate;
    a first optical fiber having an outer cladding and an inner core, a portion of said cladding forming a molecular interface with said first rigid substrate to maintain said first fiber in a fixed spatial relationship with said first substrate;
    a second rigid substrate;
    a plurality of optical fibers, each of said plurality of optical fibers having an outer cladding, an inner core, and an output port, a portion of said cladding of each of said plurality of optical fibers forming a molecular interface with said second rigid substrate to maintain said plurality of optical fibers in a fixed spatial relationship with said second substrate, said first optical fiber and said plurality of optical fibers each having an exposed core zone; and
    maintaining means for maintaining said first and second substrates in juxtaposition with one another to maintain said exposed core zone of said first optical fiber in nonparallel juxtaposition with said exposed core zone of said plurality of optical fibers, whereby light from said first fiber may be evanescently coupled into said plurality of optical fibers in said exposed core zone of said plurality of optical fibers, said plurality of optical fibers spaced a predetermined distance from another such that no evanescent coupling occurs directly between any of said plurality of optical fibers.

2. A star coupler as recited in claim 1, wherein said first and second rigid substrates are formed of a glass material.

3. A star coupler as recited in claim 2, wherein said first optical fiber and said plurality of optical fibers have an outer cladding from a doped fused silica material.

4. A star coupler as recited in claim 1, wherein a longitudinal portion of said first optical fiber is partially embedded in said first substrate and longitudinal portions of said plurality of optical fibers are partially embedded in said second substrate.

5. A star coupler as recited in claim 1, wherein said maintaining means includes one or more clamps to direct said first substrate toward said second substrate.

6. A star coupler for coupling light from a single source to a plurality of output ports, comprising:
    a first rigid substrate;
    a first plurality of optical fibers each having an outer cladding and an inner core, a portion of said cladding forming a molecular interface with said first rigid substrate to maintain said first plurality of fibers in a fixed spatial relationship with said first substrate;

a second rigid substrate;

a second plurality of optical fibers, each of said plurality of optical fibers having an outer cladding, an inner core, and an output port, a portion of said cladding of each of said plurality of optical fibers forming a molecular interface with said second rigid substrate to maintain said plurality of optical fibers in a fixed spatial relationship with said second substrate, said first plurality of optical fibers and said second plurality of optical fibers each having exposed core zones; and maintaining means for maintaining said first and second substrates in juxtaposition with one another to maintain said exposed core zone of said first plurality of optical fibers in nonparallel juxtaposition with said exposed core zone of said second plurality of optical fibers, whereby light from said first plurality of optical fibers may be evanescently coupled into said second plurality of optical fibers in said exposed core zones of each of said pluralities of optical fibers, said first plurality of optical fibers spaced a predetermined distance from one another such that no evanescent coupling occurs directly between any of said first plurality of optical fibers and said second plurality of optical fibers spaced a predetermined distance from one another such that no evanescent coupling occurs directly between any of said second plurality of optical fibers.

* * * * *